United States Patent
Liu et al.

(10) Patent No.: US 12,218,324 B2
(45) Date of Patent: Feb. 4, 2025

(54) METHOD FOR DISASSEMBLING AND SEPARATING WASTE LITHIUM-ION BATTERY

(71) Applicant: HUNAN JIN YUAN NEW MATERIALS JOINT STOCK COMPANY LIMITED, Yiyang (CN)

(72) Inventors: Xunbing Liu, Yiyang (CN); Jianjun Ouyang, Yiyang (CN); Chaowen Zhang, Yiyang (CN); Zi Wang, Yiyang (CN); Quncheng Zhou, Yiyang (CN); Zan Chen, Yiyang (CN); Shanmu Wu, Yiyang (CN); Xiongwu Dong, Yiyang (CN); Chang Liu, Yiyang (CN); Xijuan Liu, Yiyang (CN)

(73) Assignee: HUNAN JIN YUAN NEW MATERIALS JOINT STOCK COMPANY LIMITED, Yiyang (CN)

( * ) Notice: Subject to any disclaimer, the term of this patent is extended or adjusted under 35 U.S.C. 154(b) by 252 days.

(21) Appl. No.: 17/969,575

(22) Filed: Oct. 19, 2022

(65) Prior Publication Data
US 2023/0052068 A1 Feb. 16, 2023

Related U.S. Application Data

(63) Continuation of application No. PCT/CN2021/122034, filed on Sep. 30, 2021.

(30) Foreign Application Priority Data

Oct. 4, 2020 (CN) .......................... 202011067024.0

(51) Int. Cl.
*H01M 10/0525* (2010.01)
*H01M 10/54* (2006.01)

(52) U.S. Cl.
CPC ........ *H01M 10/54* (2013.01); *H01M 10/0525* (2013.01)

(58) Field of Classification Search
CPC ......... B09B 3/30; B09B 5/00; C22B 15/0008; C22B 21/0023; C22B 7/005; C22B 7/006; H01M 10/54
See application file for complete search history.

(56) References Cited

U.S. PATENT DOCUMENTS

| | | | | |
|---|---|---|---|---|
| 2016/0172678 A1* | 6/2016 | Oyama | ................... | H01G 11/52 525/60 |
| 2018/0205122 A1* | 7/2018 | Gupta | ..................... | C22B 7/006 |
| 2023/0246258 A1* | 8/2023 | Jiang | ................... | H01M 10/446 429/49 |

FOREIGN PATENT DOCUMENTS

| | | | |
|---|---|---|---|
| CN | 102509807 A | * | 6/2012 |
| CN | 102637921 A | | 8/2012 |

(Continued)

OTHER PUBLICATIONS

Internation Search Report of PCT/CN2021/122034, Mailed Dec. 1, 2021.

(Continued)

*Primary Examiner* — Terrell H Matthews

(57) ABSTRACT

A method for disassembling and separating a waste lithium-ion battery comprises: directly tearing a battery pack or a cell of the waste lithium-ion battery with water and electricity without discharging after removing a housing, then performing first wet screening, directly performing wet degumming without drying after recovering an electrolyte and removing iron by magnetic separation, then performing first crushing with water, third wet screening and second crushing with water after performing second wet screening, and finally performing jigging separation to obtain copper (Continued)

powder, aluminum powder, positive and negative electrode materials, plastic powder and separator pulp.

8 Claims, 1 Drawing Sheet

(56) References Cited

FOREIGN PATENT DOCUMENTS

| | | | | |
|---|---|---|---|---|
| CN | 105390764 | A | | 3/2016 |
| CN | 105789724 | A | | 7/2016 |
| CN | 106391267 | A | | 2/2017 |
| CN | 108461855 | A | * | 8/2018 |
| CN | 108461855 | U | | 8/2018 |
| CN | 110120560 | A | * | 8/2019 |
| CN | 210079631 | A | | 2/2020 |
| CN | 210079631 | U | * | 2/2020 |
| CN | 111085334 | A | | 5/2020 |
| CN | 111384462 | A | * | 7/2020 |
| CN | 111477985 | A | | 7/2020 |
| CN | 112246835 | A | | 1/2021 |
| CN | 216198045 | U | * | 4/2022 |
| WO | WO-2018036568 | A1 | * | 3/2018 ............. C01D 15/08 |

OTHER PUBLICATIONS

Guocai Zhu et al., "Disassembling and Echelon Utilization of Waste Lithium-ion Power Battery", Institute of Nuclear and New Energy Technology, Tsinghua University, pp. 43-46.

* cited by examiner

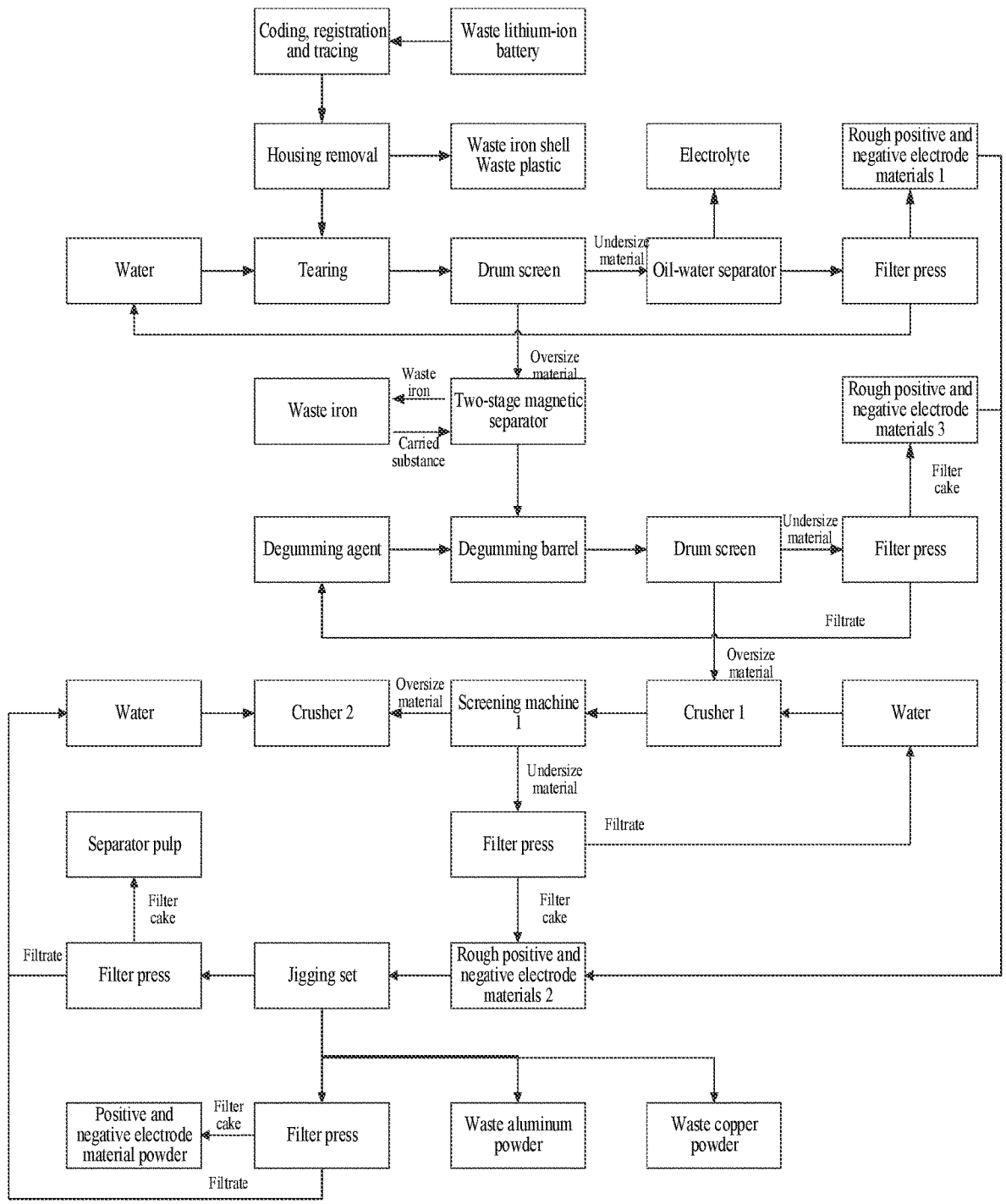

METHOD FOR DISASSEMBLING AND SEPARATING WASTE LITHIUM-ION BATTERY

CROSS-REFERENCE TO RELATED APPLICATIONS

This application is a continuation of International Patent Application No. PCT/CN2021/122034 with a filing date of Nov. 30, 2021, designating the United States, now pending, and further claims priority to Chinese Patent Application No. 202011067024.0 with a filing date of Oct. 4, 2020. The content of the aforementioned applications, including any intervening amendments thereto, are incorporated herein by reference.

TECHNICAL FIELD

The present invention relates to the field of waste lithium-ion battery recycling treatment technologies, and particularly to a method for disassembling and separating a waste lithium-ion battery.

BACKGROUND

In the field of recycling and comprehensive utilization of waste lithium-ion power battery, a general solution for disassembling the waste lithium-ion battery is: ex-service lithium-ion battery—coding and registration—housing removal—discharging—crushing—drying—screening. For example, a technology disclosed by Advanced Materials Industry (NO. 092017, P43-46, Guocai Zhu, Xiangming He, Institute of Nuclear and New Energy Technology, Tsinghua University, Disassembling and Echelon Utilization of Waste Lithium-ion Power Battery) is: "there has been a mature disassembling technology at present, in which a method of crushing and separation is mainly used for disassembling, with a process flow of discharging, high-temperature pyrolysis, mechanical crushing, particle size separation, density separation, and the like". For another example, a technology disclosed in paragraph [0047] of the specification of the patent for invention—a high-pressure liquid cutting system and an application thereof and a method for disassembling a waste lithium-ion battery with the publication number CN201510823758.X (20151124) comprises: step 1: discharging the waste lithium-ion battery to make the waste lithium-ion battery reach a specified voltage range, so as to obtain a waste lithium-ion battery to be cut. For yet another example, a technology disclosed by the patent with the publication number CN202010294915.3 (20200415) is: a method for recycling a waste lithium-ion battery, which comprises the following steps: step 1: soaking and discharging: soaking the waste lithium-ion battery in weak brine for 7 days to 14 days, and stirring once a day; step 2: disassembling: drying the waste lithium-ion battery after soaking and discharging at a low temperature, then disassembling, and separating a housing to obtain a roll core of the waste lithium-ion battery; step 3: separation of active substances: placing the roll core obtained in the step 2 into a closed reaction container, introducing a proper amount of organic solvent, stirring and heating at a low temperature to peel off the active substances from a current collector, then performing physical separation to obtain a copper foil, an aluminum foil and a separator, performing solid-liquid separation to obtain positive and negative electrode powder materials, and recycling a separated organic solvent system after treatment; step 4: drying and crushing: drying the positive and negative electrode powder materials obtained in the step 3 at a low temperature and then crushing to obtain a raw material for leaching; step 5: leaching: adding a leaching agent to leach metal elements in the raw material obtained in the step 4 to a liquid phase by an acid leaching method, and performing solid-liquid separation to obtain carbon negative electrode powder and a leaching solution containing the metal elements, wherein the carbon negative electrode powder is sintered to prepare a negative electrode material for a lithium-ion battery; step 6: precipitation: performing purification and impurity removal on the leaching solution in the step 5, then adjusting proportions of transition metal elements and concentrations of transition metal ions in the leaching solution, and adding a precipitating agent and a complexing agent to obtain a precursor for a positive electrode material of the lithium ion-battery; step 7: preliminary ammonia distillation: performing preliminary ammonia distillation and concentration on wastewater in the step 6, and conveying obtained ammonia water to the step 6 for recycling; and step 8: electrolysis: electrolyzing the wastewater subjected to the preliminary ammonia distillation and concentration through the separator to produce acid and alkali, conveying the obtained acid to the step 5 for recycling, and conveying the obtained alkali to the step 6 for recycling.

SUMMARY

Technical Problems

In the prior art above, discharging is needed before disassembling. Resistance discharging cannot realize large-scale production, and wet discharging lasts for too long time, both of which have a residual voltage of about 2.5 V, drying is also needed before crushing due to discharging with a certain amount of water, there is a possibility of thermite reaction during drying, and once the thermite reaction occurs, there is a fire risk; even after crushing, there are still problems of separation of components and yields of various factors after disassembling; and too rough or too fine crushed material has a problem of incomplete separation of components: components with a same particle size cannot be fully separated by mechanical screening, and there are aluminum containing copper, copper containing aluminum, and positive and negative electrode materials mixed in copper and aluminum, so that yields of the components are reduced, and qualities of the components are also affected.

The present invention aims to solve the technical problems of necessary discharging, necessary drying, and fire risk and incomplete separation in disassembling in a disassembling process in the prior art, and disclose a method for disassembling and separating a waste lithium-ion battery, which can completely separate all components without discharging and drying.

Problem Solutions

Technical Solutions

The technical solutions of the present invention are as follows: a method for disassembling and separating a waste lithium-ion battery specifically comprises: directly tearing a battery pack or a cell of the waste lithium-ion battery with water and electricity without discharging after removing a housing, then performing first wet screening, directly performing wet degumming without drying after recovering an electrolyte and removing iron by magnetic separation, then performing first crushing with water, third wet screening and second crushing with water after performing second wet screening, and finally performing jigging separation to obtain copper powder, aluminum powder, positive and negative electrode materials, plastic powder and separator pulp.

Further, the tearing without discharging refers to: tearing a battery pack or a cell with a voltage within 36 V without lowering or eliminating the voltage by physical and chemical means.

Further, the directly tearing with water and electricity comprises: putting the battery pack or the cell of the waste lithium-ion battery into a roller tearing machine to tear with electricity under protection of water with a mass ratio of 1 to 10 times, preferably 2 to 9 times, 3 to 8 times, 4 to 7 times and 5 to 6 times, or directly under a water spraying condition without discharging after removing a housing, so as to be torn into pieces smaller than 15×15 mm. The piece is a mixture of a copper foil and an aluminum foil adhered with the positive and negative electrode materials, an iron sheet, a plastic sheet, a separator paper sheet, and the like with water.

Further, the first wet screening comprises: passing the torn mixture pieces through a 150-mesh drum screen under push of water to perform the wet screening, wherein undersize materials are the water, the electrolyte and the positive and negative electrode materials falling off in a tearing process; and an oversize material is a piece mixture of a copper foil and an aluminum foil adhered with the positive and negative electrode materials, an iron shell, a plastic housing, separator paper, and the like.

Further, the recovering the electrolyte comprises: performing oil-water separation on undersize materials of the wet screening, a light liquid being the electrolyte, and a heavy liquid and a precipitate being water and rough positive and negative electrode materials 1, performing separation by a plate-and-frame filter press, a filter cake being the rough positive and negative electrode materials 1, and a filtrate returning to the section as tearing water, and packing the electrolyte by a closed iron drum to store in a warehouse and sent to a qualified unit for treatment as the electrolyte.

Further, the removing the iron by magnetic separation comprises: performing two-stage magnetic separation on an oversize material of the wet screening, and separating an iron sheet of the torn battery pack and cell to package and put in storage, wherein the two-stage magnetic separation is intended to allow other nonmagnetic substances carried by the iron sheet in first-stage magnetic separation to produce a shift under an action of the water when converting to second-stage magnetic separation, so that the nonmagnetic substances automatically break away from the carrying to be separated from the iron sheet.

Further, the wet degumming comprises: soaking and stirring the pieces of the torn battery with a degumming agent in a degumming barrel for a certain time, so that the positive and negative electrode materials are separated from a copper foil and an aluminum foil or adhesion thereof fails, thus being easy to peel off.

Further, the wet degumming comprises: allowing a material after iron removal by magnetic separation, which is a piece mixture of a copper foil and an aluminum foil adhered with the positive and negative electrode materials, plastic, separator paper, and the like, to enter the degumming barrel, adding a certain concentration of degumming agent, soaking and stirring for a certain time, so that the positive and negative electrode materials are separated from the copper foil and the aluminum foil, or positive and negative electrode films are foamed and degummed.

Further, the degumming agent is an organic solvent, such as one or a mixture of multiple of acetone, tetrahydrofuran, N-dimethylacetamide and dimethyl sulfoxide.

Further, the degumming agent is the organic solvent of tetrahydrofuran.

Further, the certain concentration in the wet degumming step is a volume ratio of 1% to 20%, preferably 5% to 15%, and 10%.

Further, the soaking and stirring for a certain time in the wet degumming step refers to soaking and stirring for 5 minutes to 60 minutes, preferably 10 minutes to 50 minutes, 20 minutes to 40 minutes, and 30 minutes, at a stirring speed of 15 rpm to 60 rpm, preferably 20 rpm to 55 rpm, 25 rpm to 50 rpm, and 35 rpm to 45 rpm.

Further, the second wet screening comprises: passing materials subjected to wet degumming through the 150-mesh drum screen, wherein undersize materials are a sol solution and the separated positive and negative electrode materials, and performing filter-pressing by a plate-and-frame filter press, a filter cake being rough positive and negative electrode materials 3, and a filtrate being water containing a degumming agent and returning to supplement with a certain amount of degumming agent for recycling, wherein an oversize material is a piece mixture of a copper foil and an aluminum foil containing the positive and negative electrode materials, plastic, separator paper, and the like, and is crushed and screened once.

Further, the crushing with water for the first time comprises: adding water with a mass ratio of 3 to 5 times, preferably 4 times, to the oversize material after the second wet screening, and crushing to be lower than 200 meshes.

Further, the third wet screening comprises: passing materials crushed with water for the first time through the 150-mesh drum screen, wherein undersize materials are the positive and negative electrode materials and the water, and performing filter-pressing by a plate-and-frame filter press, a filter cake being rough positive and negative electrode materials 2, and a filtrate being water and returning to crushing and screening procedures of the section for recycling, wherein oversize materials are the copper powder, the aluminum powder, the plastic powder, the separator pulp, positive and negative electrode material powder, and the like.

Further, the crushing with water for the second time comprises: continuously adding water to the oversize material after the third wet screening, and crushing to be lower than 200 meshes.

Further, the jigging separation comprises: feeding an oversize material crushed with water for the second time to a beneficiation jigger together with rough positive and negative electrode materials 1, rough positive and negative electrode materials 2 and rough positive and negative electrode materials 3, jigging with water to re-separate, separating the copper powder, the aluminum powder, the positive and negative electrode materials, the plastic powder and the separator pulp, and passing the positive and negative electrode materials, the plastic powder and the separator pulp through a plate-and-frame filter press respectively for filter-pressing, filter cakes being the positive and negative electrode materials, the plastic powder and the separator pulp, and being packaged and put in storage, and a filtrate being water and returning to a crushing procedure of the section as adding water for recycling.

Beneficial Effects of the Invention

Beneficial Effects

According to the present invention, due to the above technical solution, discharging and drying are not required in the disassembling process of the waste lithium-ion battery, so that the components can be completely separated, and the technical problems of necessary discharging, necessary drying, and fire risk and incomplete separation in disassembling in a disassembling process in the prior art are solved.

BRIEF DESCRIPTION OF THE DRAWINGS

Description of the Drawings

FIG. 1 is a process flow chart of the present invention.

OPTIMAL EMBODIMENTS FOR IMPLEMENTING THE INVENTION

Optimal Implementations of the Invention

A method for disassembling and separating a waste lithium-ion battery comprises the following steps. In a, coding and registration are performed: a recycled waste lithium-ion battery is coded and registered.

In step b, tearing with electricity is performed: a waste lithium-ion battery with a model of 18650 and a weight of 20 kg is placed in water to be submerged, torn by a roller and cut into pieces of 15×15 mm.

In step c, screening with water is performed: wet screening is performed on the torn mixture pieces by a 150-mesh screen under push of water, wherein undersize materials are water, an electrolyte, and positive and negative electrode materials falling off in a tearing process; and an oversize material is a piece mixture of a copper foil and an aluminum foil containing the positive and negative electrode materials, an iron shell, a plastic housing, separator paper, and the like.

In step d, the electrolyte is recovered: oil-water separation is performed on the undersize materials obtained by screening with water in the step c, a light liquid is the electrolyte, with a volume of 1,150 mL measured by a measuring cylinder, and a heavy liquid and a precipitate are the water and rough positive and negative electrode materials 1, separation is performed by a suction filter, and dry power after drying is 325.1 g.

In step e, iron is removed by magnetic separation: iron in the piece mixture of the oversize material of the drum screen obtained by screening with water in the step c is separated with a magnet, and a waste iron sheet has a weight of 4,792.1 g.

In step f, wet degumming is performed: the material after iron removal by magnetic separation is a piece mixture of a copper foil and an aluminum foil adhered with the positive and negative electrode materials, plastic, separator paper, and the like, and is put into a 0.2 m³ reaction barrel, added with 0.15 m³ of water, added with 0.01 m³ of tetrahydrofuran, and stirred for 15 minutes, and then there is an obvious foaming phenomenon on surfaces of the positive and negative electrode materials. Second wet screening is performed by a 150-mesh screen, wherein undersize materials are a sol solution and the separated positive and negative electrode materials, and suction filtration is performed by a suction filter, and a filter cake is rough positive and negative electrode materials 3, with a weight of 1,425.8 g, wherein an oversize material (containing 32.7% water) is a piece mixture of a copper foil and an aluminum foil adhered with the positive and negative electrode materials, plastic, separator paper, and the like, and is crushed with water.

In step g, crushing and screening with water are performed: 14,833.3 g of the piece mixture of the copper foil and the aluminum foil adhered with the positive and negative electrode materials, the plastic, the separator paper, and the like (containing 16.2% water) after the second wet screening in the step f is added with 10 kg of water and crushed to be lower than 200 meshes in a crusher, and then wet screening is performed by a 150-mesh screen, wherein undersize materials are the positive and negative electrode materials and the water. Filter-pressing is performed by a suction filter, and a filter cake is rough positive and negative electrode materials 2, with a weight of 4,028.7 g (containing 25.65% water), wherein an oversize material is continuously added with water and crushed to be 200 meshes, in which the copper powder, the aluminum powder, the positive and negative electrode materials, the plastic powder and the separator pulp are separated by a vibrating jigger together with the rough positive and negative electrode materials 1, the rough positive and negative electrode materials 2 and the rough positive and negative electrode materials 3. Suction filtration is performed on the positive and negative electrode materials, the plastic powder and the separator pulp respectively by a suction filter, and filter cakes are dried, and comprise 1,612.4 g of copper powder, 3,004.9 g of aluminum powder, 6,412.1 g of positive and negative electrode materials, and 4,172.6 g of plastic powder and separator pulp respectively.

DETAILED DESCRIPTION

Implementations of the Invention

In order to understand the present invention more clearly, the present invention is further described in detail hereinafter by specific embodiments with reference to FIG. 1.

Implementation 1: A method for disassembling and separating a waste lithium-ion battery comprises: directly tearing a battery pack or a cell of the waste lithium-ion battery with water and electricity without discharging after removing a housing, then performing first wet screening, directly performing wet degumming without drying after recovering an electrolyte and removing iron by magnetic separation, then performing first crushing with water, third wet screening and second crushing with water after performing second wet screening, and finally performing jigging separation to obtain copper powder, aluminum powder, positive and negative electrode materials, plastic powder and separator pulp.

The tearing without discharging refers to: tearing a battery pack or a cell with a voltage within 36 V without lowering or eliminating the voltage by physical and chemical means. That is to say, the battery needs to be discharged before disassembling in the prior art, but the battery can be directly disassembled without discharging in the present invention.

The directly tearing with water and electricity comprises: putting the battery pack or the cell of the waste lithium-ion battery into a roller tearing machine to tear with electricity directly under a water spraying condition without discharging after removing a housing, so as to be torn into pieces smaller than 15×15 mm. The piece is a mixture of a copper foil and an aluminum foil adhered with the positive and negative electrode materials, an iron sheet, a plastic sheet, a separator paper sheet, and the like with water.

The first wet screening comprises: passing the torn mixture pieces through a 150-mesh drum screen under push of water to perform the wet screening, wherein undersize materials are the water, the electrolyte and the positive and negative electrode materials falling off in a tearing process; and an oversize material is a piece mixture of a copper foil and an aluminum foil containing the positive and negative electrode materials, an iron shell, a plastic housing, separator paper, and the like.

The recovering the electrolyte comprises: performing oil-water separation on undersize materials of the wet screening, a light liquid being the electrolyte, and a heavy liquid and a precipitate being water and rough positive and negative electrode materials 1, performing separation by a plate-and-frame filter press, a filter cake being the rough positive and negative electrode materials 1, and a filtrate returning to the section as tearing water, and packing the electrolyte by a closed iron drum to store in a warehouse and sent to a qualified unit for treatment as the electrolyte.

The removing the iron by magnetic separation comprises: performing two-stage magnetic separation on an oversize material of the wet screening, and separating an iron sheet of the torn battery pack and cell to package and put in storage, wherein the two-stage magnetic separation is intended to allow other nonmagnetic substances carried by the iron sheet in first-stage magnetic separation to produce a shift under an action of the water when converting to second-stage magnetic separation, so that the nonmagnetic substances automatically break away from the carrying to be separated from the iron sheet.

The wet degumming comprises: soaking and stirring the pieces of the torn battery with a degumming agent in a degumming barrel for a certain time, so that the positive and negative electrode materials are separated from a copper foil and an aluminum foil or adhesion thereof fails, thus being easy to peel off.

Further, the wet degumming comprises: allowing a material after iron removal by magnetic separation, which is a piece mixture of a copper foil and an aluminum foil adhered with the positive and negative electrode materials, plastic, separator paper, and the like, to enter the degumming barrel, adding a certain concentration of degumming agent, soaking and stirring for a certain time, so that the positive and negative electrode materials are separated from the copper foil and the aluminum foil, or positive and negative electrode films are foamed and degummed.

The degumming agent is an organic solvent, such as one or a mixture of multiple of acetone, tetrahydrofuran, N-dimethylacetamide and dimethyl sulfoxide, preferably the tetrahydrofuran.

The certain concentration in the wet degumming step is a volume ratio of 1% to 20%, preferably 5% to 15%, and 10%.

The soaking and stirring for a certain time in the wet degumming step refers to soaking and stirring for 5 minutes to 60 minutes, preferably 10 minutes to 50 minutes, 20 minutes to 40 minutes, and 30 minutes, at a stirring speed of 15 rpm to 60 rpm, preferably 20 rpm to 55 rpm, 25 rpm to 50 rpm, and 35 rpm to 45 rpm.

The second wet screening comprises: passing materials subjected to wet degumming through the 150-mesh drum screen, wherein undersize materials are a sol solution and the separated positive and negative electrode materials, and performing filter-pressing by a plate-and-frame filter press, a filter cake being rough positive and negative electrode materials 3, and a filtrate being water containing a degumming agent and returning to supplement with a certain amount of degumming agent for recycling, wherein an oversize material is a piece mixture of a copper foil and an aluminum foil containing the positive and negative electrode materials, plastic, separator paper, and the like, and is crushed and screened once.

The crushing with water for the first time comprises: adding water with a mass ratio of 3 to 5 times to the oversize material after the second wet screening, and crushing to be lower than 200 meshes.

The third wet screening comprises: passing materials crushed with water for the first time through the 150-mesh drum screen, wherein undersize materials are the positive and negative electrode materials and the water, and performing filter-pressing by a plate-and-frame filter press, a filter cake being rough positive and negative electrode materials 2, and a filtrate being water and returning to crushing and screening procedures of the section for recycling, wherein oversize materials are the copper powder, the aluminum powder, the plastic powder, the separator pulp, positive and negative electrode material powder, and the like.

The crushing with water for the second time comprises: continuously adding water to the oversize material after the third wet screening, and crushing to be lower than 200 meshes.

The jigging separation comprises: feeding an oversize material crushed with water for the second time to a beneficiation jigger together with rough positive and negative electrode materials 1, rough positive and negative electrode materials 2 and rough positive and negative electrode materials 3, jigging with water to re-separate, separating the copper powder, the aluminum powder, the positive and negative electrode materials, the plastic powder and the separator pulp, and passing the positive and negative electrode materials, the plastic powder and the separator pulp through a plate-and-frame filter press respectively for filter-pressing, filter cakes being the positive and negative electrode materials, the plastic powder and the separator pulp, and being packaged and put in storage, and a filtrate being water and returning to a crushing procedure of the section as adding water for recycling.

Embodiment 1: A method for disassembling and separating a waste lithium-ion battery comprised the following steps. In a, coding and registration were performed: a recycled waste lithium-ion battery was coded and registered.

In step b, a housing was removed: a housing of a battery with a battery number of H-52201 was removed, and one of seven battery packs, with a weight of 1,958.0 g, was taken out.

In step c, tearing with water and electricity was performed: the battery was directly placed in water to be submerged without discharging, and cut with a blade into pieces smaller than 15×15 mm.

In step d, screening with water was performed: wet screening was performed on the torn mixture pieces by a 150-mesh screen, wherein undersize materials were water, an electrolyte, and positive and negative electrode materials falling off in a tearing process; and an oversize material was a piece mixture of a copper foil and an aluminum foil containing the positive and negative electrode materials, an iron shell, a plastic housing, separator paper, and the like.

In step e, the electrolyte was recovered: oil-water separation was performed on the undersize materials obtained by wet screening in the step d through a separating funnel, a light liquid was the electrolyte, with a volume of 120 mL measured by a measuring cylinder, and a heavy liquid and a precipitate were the water and rough positive and negative electrode materials 1, separation was performed by a suction filter, and dry power after drying was 47.46 g.

In step f, iron was removed by magnetic separation: iron in the piece mixture of the oversize material of the drum screen obtained by wet screening in the step d was separated with a magnet, which was 0.0 g.

In step g, wet degumming was performed: the material after iron removal by magnetic separation was a piece mixture of a copper foil and an aluminum foil adhered with the positive and negative electrode materials, plastic, separator paper, and the like, and was put into a 5000 mL beaker, added with 3000 mL of water, added with 150 mL of tetrahydrofuran, and stirred for 30 minutes, and then the positive and negative electrode materials showed an obvious foaming phenomenon. Second wet screening was performed by a 150-mesh screen, wherein undersize materials were a sol solution and the separated positive and negative electrode materials, and suction filtration was performed by a suction filter, and a filter cake was rough positive and negative electrode materials 3, with a weight of 324.25 g, wherein an oversize material (containing 41.4% water) was a piece mixture of a copper foil and an aluminum foil adhered with the positive and negative electrode materials, plastic, separator paper, and the like, and was crushed with water.

In step h, crushing and screening with water were performed: 2,060.2 g of the piece mixture of the copper foil and the aluminum foil adhered with the positive and negative electrode materials, the plastic, the separator paper, and the like (containing 21% water) after the second wet screening in the step g was added with 10 kg of water and crushed to be lower than 200 meshes in a crusher, and then third wet screening was performed by a 150-mesh screen, wherein undersize materials were the positive and negative electrode materials and the water. Filter-pressing was performed by a suction filter, and a filter cake was rough positive and negative electrode materials 2, with a weight of 536.91 g (containing 38.5% water), wherein 1,944.2 g of oversize material was continuously added with 10 kg of water and crushed to be 200 meshes, in which the copper powder, the aluminum powder, the positive and negative electrode materials, the plastic powder and the separator pulp were separated by a vibrating jigger together with the rough positive and negative electrode materials 1, the rough positive and negative electrode materials 2 and the rough positive and negative electrode materials 3. Suction filtration was performed on the positive and negative electrode materials, the plastic powder and the separator pulp respectively by a suction filter, and filter cakes were dried, and comprised 228.60 g of copper powder, 428.44 g of aluminum powder, 943.10 g of positive and negative electrode materials, and 251.40 g of plastic powder and separator pulp respectively.

Embodiment 2: A method for disassembling and separating a waste lithium-ion battery comprised the following steps. In a, coding and registration were performed: a recycled waste lithium-ion battery was coded and registered.

In step b, tearing with electricity was performed: a housing of a waste lithium-ion battery with a serial number of H-52187 was removed, and seven battery packs were all taken out, with a weight of 13,867 g, placed in water to be submerged, torn by a hobbing cutter and cut into pieces smaller than 15×15 mm.

In step c, screening with water was performed: wet screening was performed on the torn mixture pieces by a 150-mesh screen under push of water, wherein undersize materials were water, an electrolyte, and positive and negative electrode materials falling off in a tearing process; and an oversize material was a piece mixture of a copper foil and an aluminum foil containing the positive and negative electrode materials, an iron shell, a plastic housing, separator paper, and the like.

In step d, the electrolyte was recovered: oil-water separation was performed on the undersize materials obtained by screening with water in the step c, a light liquid was the electrolyte, with a volume of 835 mL measured by a measuring cylinder, and a heavy liquid and a precipitate were the water and rough positive and negative electrode materials 1, separation was performed by a suction filter, and dry power after drying was 355.1 g.

In step e, iron was removed by magnetic separation: iron in the piece mixture of the oversize material of the drum screen obtained by wet screening in the step c was separated with a magnet, which was 0.0 g.

In step f, wet degumming was performed: the material after iron removal by magnetic separation was a piece mixture of a copper foil and an aluminum foil adhered with the positive and negative electrode materials, plastic, separator paper, and the like, and was put into a 0.1 m$^3$ reaction barrel, added with 0.5 m$^3$ of water, added with 12.5 kg of tetrahydrofuran and 12.5 kg of N-dimethylacetamide, and stirred for 10 minutes, and then there was an obvious foaming phenomenon on surfaces of the positive and negative electrode materials. Second wet screening was performed by a 150-mesh screen, wherein undersize materials were a sol solution and the separated positive and negative electrode materials, and suction filtration was performed by a suction filter, and a filter cake was rough positive and negative electrode materials 3, with a weight of 1,075.3 g, wherein an oversize material (containing 38.1% water) was a piece mixture of a copper foil and an aluminum foil adhered with the positive and negative electrode materials, plastic, separator paper, and the like, and was crushed with water.

In step h, crushing and screening with water were performed: 21,150 g of the piece mixture of the copper foil and the aluminum foil adhered with the positive and negative electrode materials, the plastic, the separator paper, and the like (containing 15% water) after the second wet screening in the wet degumming step was added with 10 kg of water and crushed to be lower than 200 meshes in a crusher, and then wet screening was performed by a 150-mesh screen, wherein undersize materials were the positive and negative electrode materials and the water. Filter-pressing was performed by a suction filter, and a filter cake was rough positive and negative electrode materials 2, with a weight of 2,701.8 g (containing 32.6% water), wherein 15, 840.1 g of oversize material (containing 15% water) was continuously added with 10 kg of water and crushed to be 200 meshes, in which the copper powder, the aluminum powder, the positive and negative electrode materials, the plastic powder and the separator pulp were separated by a vibrating jigger together with the rough positive and negative electrode materials 1, the rough positive and negative electrode materials 2 and the rough positive and negative electrode materials 3. Suction filtration was performed on the positive and negative electrode materials, the plastic powder and the separator pulp respectively by a suction filter, and separated substances were dried, and comprised 1,596.3 g of copper powder, 2,993.5 g of aluminum powder, 6,580.4 g of positive and negative electrode materials, and 1,861.5 g of plastic powder and separator pulp respectively.

Embodiment 3: A method for disassembling and separating a waste lithium-ion battery comprised the following steps. In a, coding and registration were performed: a recycled waste lithium-ion battery was coded and registered.

In step b, tearing with electricity was performed: a waste lithium-ion battery with serial numbers of H-50321 and H-57106 and a weight of 68.6 kg was placed in water together with a housing to be submerged, torn by a roller and cut into pieces smaller than 15×15 mm.

In step c, screening with water was performed: wet screening was performed on the torn mixture pieces by a 150-mesh screen under push of water, wherein undersize materials were water, an electrolyte, and positive and negative electrode materials falling off in a tearing process; and an oversize material was a piece mixture of a copper foil and an aluminum foil containing the positive and negative electrode materials, an iron shell, a plastic housing, separator paper, and the like.

In step d, the electrolyte was recovered: oil-water separation was performed on the undersize materials obtained by screening with water in the step c, a light liquid was the electrolyte, with a volume of 1,600 mL measured by a measuring cylinder, and a heavy liquid and a precipitate were the water and rough positive and negative electrode materials 1, separation was performed by a suction filter, and dry power after drying was 710.4 g.

In step e, iron was removed by magnetic separation: iron in the piece mixture of the oversize material of the drum screen obtained by wet screening in the step c was separated with a magnet, and a waste iron sheet had a weight of 41.88 kg.

In step f, wet degumming was performed: the material after iron removal by magnetic separation was a piece mixture of a copper foil and an aluminum foil adhered with the positive and negative electrode materials, plastic, separator paper, and the like, and was put into a 0.2 m$^3$ reaction barrel, added with 0.15 m$^3$ of water, added with 0.01 m$^3$ of tetrahydrofuran, and stirred for 30 minutes, and then there was an obvious foaming phenomenon on surfaces of the positive and negative electrode materials. Second wet screening was performed by a 150-mesh screen, wherein undersize materials were a sol solution and the separated positive and negative electrode materials, and suction filtration was performed by a suction filter, and a filter cake was rough positive and negative electrode materials 3, with a weight of 2,112.3 g, wherein an oversize material (containing 35.4% water) was a piece mixture of a copper foil and an aluminum foil adhered with the positive and negative electrode materials, plastic, separator paper, and the like, and was crushed with water.

In step g, crushing and screening with water were performed: 40,915.4 g of the piece mixture of the copper foil and the aluminum foil adhered with the positive and negative electrode materials, the plastic, the separator paper, and the like (containing 14.1% water) after the second wet screening in the wet degumming step was added with 10 kg of water and crushed to be lower than 200 meshes in a crusher, and then wet screening was performed by a 150-mesh screen, wherein undersize materials were the positive and negative electrode materials and the water. Filter-pressing was performed by a suction filter, and a filter cake was rough positive and negative electrode materials 2, with a weight of 8,287.6 g (containing 31.5% water), wherein an oversize material was continuously added with 10 kg of water and crushed to be 200 meshes, in which the copper powder, the aluminum powder, the positive and negative electrode materials, the plastic powder and the separator pulp were separated by a vibrating jigger together with the rough positive and negative electrode materials 1, the rough positive and negative electrode materials 2 and the rough positive and negative electrode materials 3. Suction filtration was performed on the positive and negative electrode materials, the plastic powder and the separator pulp respectively by a suction filter, and filter cakes were dried, and comprised 3,192.8 g of copper powder, 6,008.1 g of aluminum powder, 13,155.4 g of positive and negative electrode materials, and 3,720.9 g of plastic powder and separator pulp respectively.

Embodiment 4: A method for disassembling and separating a waste lithium-ion battery comprised the following steps. In a, coding and registration were performed: a recycled waste lithium-ion battery was coded and registered.

In step b, tearing with electricity was performed: a waste lithium-ion battery with a model of 18650 and a weight of 20 kg was placed in water to be submerged, torn by a roller and cut into pieces of 15×15 mm.

In step c, screening with water was performed: wet screening was performed on the torn mixture pieces by a 150-mesh screen under push of water, wherein undersize materials were water, an electrolyte, and positive and negative electrode materials falling off in a tearing process; and an oversize material was a piece mixture of a copper foil and an aluminum foil containing the positive and negative electrode materials, an iron shell, a plastic housing, separator paper, and the like.

In step d, the electrolyte was recovered: oil-water separation was performed on the undersize materials obtained by screening with water in the step c, a light liquid was the electrolyte, with a volume of 1,150 mL measured by a measuring cylinder, and a heavy liquid and a precipitate were the water and rough positive and negative electrode materials 1, separation was performed by a suction filter, and dry power after drying was 325.1 g.

In step e, iron was removed by magnetic separation: iron in the piece mixture of the oversize material of the drum screen obtained by screening with water in the step c was separated with a magnet, and a waste iron sheet had a weight of 4,792.1 g.

In step f, wet degumming was performed: the material after iron removal by magnetic separation was a piece mixture of a copper foil and an aluminum foil adhered with the positive and negative electrode materials, plastic, separator paper, and the like, and was put into a 0.2 m$^3$ reaction barrel, added with 0.15 m$^3$ of water, added with 0.01 m$^3$ of tetrahydrofuran, and stirred for 15 minutes, and then there was an obvious foaming phenomenon on surfaces of the positive and negative electrode materials. Second wet screening was performed by a 150-mesh screen, wherein undersize materials were a sol solution and the separated positive and negative electrode materials, and suction filtration was performed by a suction filter, and a filter cake was rough positive and negative electrode materials 3, with a weight of 1,425.8 g, wherein an oversize material (containing 32.7% water) was a piece mixture of a copper foil and an aluminum foil adhered with the positive and negative electrode materials, plastic, separator paper, and the like, and was crushed with water.

In step g, crushing and screening with water were performed: 14,833.3 g of the piece mixture of the copper foil and the aluminum foil adhered with the positive and negative electrode materials, the plastic, the separator paper, and the like (containing 16.2% water) after the second wet screening in the step f was added with 10 kg of water and crushed to be lower than 200 meshes in a crusher, and then wet screening was performed by a 150-mesh screen, wherein undersize materials were the positive and negative electrode materials and the water. Filter-pressing was performed by a suction filter, and a filter cake was rough positive and negative electrode materials 2, with a weight of 4,028.7 g (containing 25.65% water), wherein an oversize material was continuously added with water and crushed to be 200 meshes, in which the copper powder, the aluminum powder, the positive and negative electrode materials, the plastic powder and the separator pulp were separated by a vibrating jigger together with the rough positive and negative electrode materials 1, the rough positive and negative electrode materials 2 and the rough positive and negative electrode materials 3. Suction filtration was performed on the positive and negative electrode materials, the plastic powder and the separator pulp respectively by a suction filter, and filter cakes were dried, and comprised 1,612.4 g of copper powder, 3,004.9 g of aluminum powder, 6,412.1 g of positive and negative electrode materials, and 4,172.6 g of plastic powder and separator pulp respectively.

The roller and the drum screen used in the embodiments of the present invention are both market products produced by Henan Zhengzhou Mining Machinery Co., Ltd., a model number of the roller is 2PG0425 and a model number of the drum screen is GTS-0608.

TABLE 1

Inspection data sheet of disassembled components of the present invention.

| Weight of component (g) | Embodiment 1 | Embodiment 2 | Embodiment 3 | Embodiment 4 | Remark |
|---|---|---|---|---|---|
| Before disassembling | 1,958 | 13,867 | 68,600 | 20,000 | |
| After disassembling | | | | | |
| Electrolyte (mL) | 120 | 835 | 1,600 | 1,150 | |
| Rough positive and negative electrode materials 1 | 47.46 | 355.1 | 710.4 | 325.1 | Drying |
| Falling-off rate of positive and negative electrode materials % | 5.03 | 5.4 | 5.4 | 5.07 | |
| Iron | 0.0 | 0.0 | 41,880 | 4,792.1 | Converting to dry basis |
| Rough positive and negative electrode materials 2 | 330.2 | 1821.0 | 5,745.5 | 2,995.29 | |
| Falling-off rate of positive and negative electrode materials % | 35.01 | 26.67 | 43.67 | 46.71 | |
| Rough positive and negative electrode materials 3 | 190.0 | 665.61 | 1,364.55 | 959.56 | |
| Falling-off rate of positive and negative electrode materials % | 20.14 | 10.11 | 10.37 | 14.96 | |
| Copper powder | 228.60 | 1,596.3 | 3,192.8 | 1,612.4 | |
| Aluminum powder | 428.44 | 2,993.5 | 6,008.1 | 3,004.9 | |
| Positive and negative electrode material powder | 943.10 | 6,580.4 | 13,155.4 | 6,412.1g | |
| Plastic powder and separator pulp | 251.40 | 1,861.5 | 3,720.9 | 4,172.6 | |
| Total falling-off rate of positive and negative electrode materials % (from tearing to first crushing) | 60.18 | 42.18 | 59.44 | 66.74 | |

TABLE 2

Inspection data sheet of ingredients of components in Embodiment 4 of the present invention.

| | Inspection data | | | | | |
|---|---|---|---|---|---|---|
| Name | Copper (%) | Aluminum (%) | Iron (%) | Positive and negative electrode materials (%) | Plastic and separator (%) | Remark |
| Copper powder | 97.14 | 1.81 | 0.15 | 0.5 | 0.5 | 1. Copper, aluminum and iron elements are measured by an AAS method; and 2. other elements except copper, iron and aluminum in the positive and negative electrode material powder are not measured; |
| Aluminum powder | 1.45 | 98.11 | 0.12 | 1.0 | 1.0 | |
| Iron | 0.21 | 0.16 | 98.15 | 0.2 | 1.5 | |
| Rough positive and negative electrode materials 1 | 4.05 | 5.12 | 0.6 | / | / | |
| Rough positive and negative electrode materials 2 | 6.14 | 7.21 | 0.11 | / | / | |
| Rough positive and negative electrode materials 3 | 2.10 | 2.44 | 0.09 | / | / | |
| Positive and negative electrode material powder | 0.56 | 0.81 | 0.04 | / | / | |
| Plastic powder and separator pulp | 0.15 | 0.04 | 0.08 | 0.5 | / | |

The above are only the illustrative embodiments of the present invention, and are not intended to limit the present invention in form and in essence. It should be pointed out that, for those of ordinary skills in the technical field, several improvements and supplementations made without departing from the method of the present invention should also be regarded as falling within the scope of protection of the present invention. Those skilled in the art may make some alterations, modifications and equivalent changes by using the above-mentioned technical contents without departing from the spirit and scope of the present invention, which are all equivalent embodiments of the present invention. Meanwhile, any alterations, modifications and evolutions of equivalent changes made to the above embodiments according to the essential technology of the present invention still belong to the scope of protection of the present invention.

INDUSTRIAL APPLICABILITY

The technology of the present invention has passed the plant trial.

The invention claimed is:

1. A method for disassembling and separating a waste lithium-ion battery, comprising: putting a battery pack or a cell with a voltage within 36 V of the waste lithium-ion battery into a roller tearing machine to tear with electricity directly under protection of water with a mass ratio of 1 to 10 times or directly under a water spraying condition without lowering or eliminating the voltage by physical and chemical means after removing a housing, then performing first wet screening, directly performing wet degumming without drying after recovering an electrolyte and removing iron by two-stage magnetic separation, then performing first crushing with water, third wet screening and second crushing with water after performing second wet screening, and finally performing jigging separation to obtain copper powder, aluminum powder, positive and negative electrode materials, plastic powder and separator pulp; and
   wherein the recovering the electrolyte comprises: performing oil-water separation on undersize materials of the wet screening, a light liquid being the electrolyte, and a heavy liquid and a precipitate being the water and rough positive and negative electrode materials 1, performing separation by a plate-and-frame filter press, a filter cake being the rough positive and negative electrode materials 1, and a filtrate returning to the section as tearing water, and packing the electrolyte by a closed iron drum to store in a warehouse and sent to a qualified unit for treatment as the electrolyte.

2. The method for disassembling and separating the waste lithium-ion battery according to claim 1, wherein the battery pack or the cell is put into the roller tearing machine to tear with electricity directly under protection of water with a mass ratio of 2 to 9 times or directly under the water spraying condition, so as to be torn into pieces smaller than 15×15 mm.

3. The method for disassembling and separating the waste lithium-ion battery according to claim 1, wherein the first wet screening comprises: passing the torn mixture pieces through a 150-mesh drum screen under push of water to perform the wet screening, wherein undersize materials are the water, the electrolyte and the positive and negative electrode materials falling off in a tearing process; and an oversize material is a piece mixture of a copper foil and an aluminum foil containing the positive and negative electrode materials, an iron shell, a plastic housing, separator paper, and the like.

4. The method for disassembling and separating the waste lithium-ion battery according to claim 1, wherein the removing the iron by magnetic separation comprises: performing two-stage magnetic separation on an oversize material of the wet screening, and separating an iron sheet of the torn battery pack and cell to package and put in storage, wherein the two-stage magnetic separation is intended to allow other nonmagnetic substances carried by the iron sheet in first-stage magnetic separation to produce a shift under an action of the water when converting to second-stage magnetic separation, so that the nonmagnetic substances automatically break away from the carrying to be separated from the iron sheet.

5. The method for disassembling and separating the waste lithium-ion battery according to claim 1, wherein the wet degumming comprises: adding a degumming agent to the pieces of the torn battery according to a volume ratio of 5% to 15% in a degumming barrel to stir and soak for 5 minutes to 60 minutes, so that the positive and negative electrode materials are separated from a copper foil and an aluminum foil or adhesion thereof fails, thus being easy to peel off.

6. The method for disassembling and separating the waste lithium-ion battery according to claim 1, wherein the second wet screening comprises: passing materials subjected to wet degumming through the 150-mesh drum screen, wherein undersize materials are a sol solution and the separated positive and negative electrode materials, and performing filter-pressing by a plate-and-frame filter press, a filter cake being rough positive and negative electrode materials 3, and a filtrate being water containing a degumming agent and returning to supplement with a certain amount of degumming agent for recycling, wherein an oversize material is a piece mixture of a copper foil and an aluminum foil containing the positive and negative electrode materials, plastic, separator paper, and the like, and is crushed and screened once.

7. The method for disassembling and separating the waste lithium-ion battery according to claim 1, wherein the third wet screening comprises: passing materials crushed with water for the first time through the 150-mesh drum screen, wherein undersize materials are the positive and negative electrode materials and the water, and performing filter-pressing by a plate-and-frame filter press, a filter cake being rough positive and negative electrode materials 2, and a filtrate being water and returning to crushing and screening procedures of the section for recycling, wherein oversize materials are the copper powder, the aluminum powder, the plastic powder, the separator pulp, and positive and negative electrode material powder.

8. The method for disassembling and separating the waste lithium-ion battery according to claim 1, wherein the jigging separation comprises: feeding an oversize material crushed with water for the second time to a beneficiation jigger together with rough positive and negative electrode materials 1, rough positive and negative electrode materials 2 and rough positive and negative electrode materials 3, jigging with water to re-separate, separating the copper powder, the aluminum powder, the positive and negative electrode materials, the plastic powder and the separator pulp, and passing the positive and negative electrode materials, the plastic powder and the separator pulp through a plate-and-frame filter press respectively for filter-pressing, filter cakes being the positive and negative electrode materials, the plastic powder and the separator pulp, and being packaged and put in storage, and a filtrate being water and returning to a crushing procedure of the section as adding water for recycling.

* * * * *